July 21, 1931. W. BONSOR 1,815,699
APPARATUS FOR POSITIONING AND HOLDING WORK
FOR MATERIAL WORKING APPARATUS
Filed Oct. 15, 1926 3 Sheets-Sheet 3
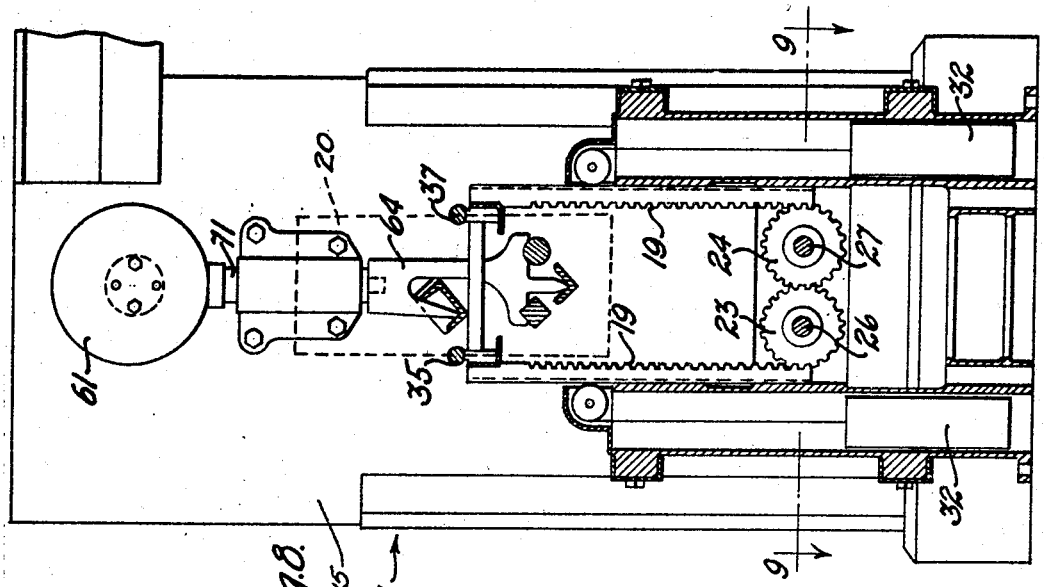
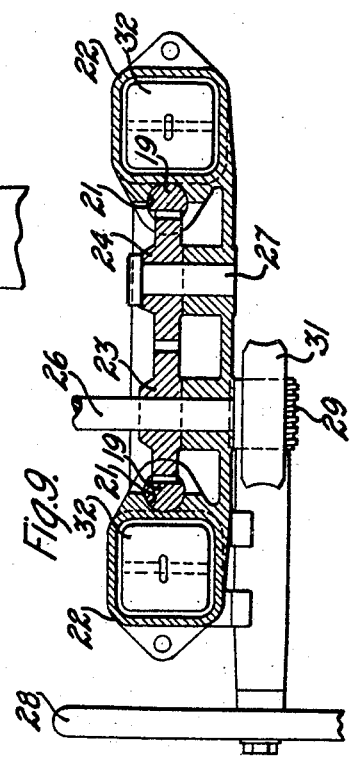
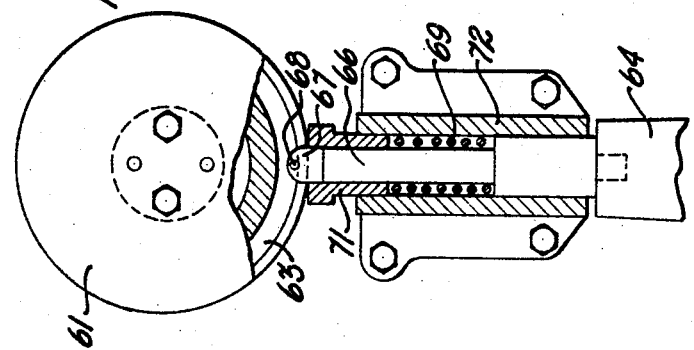
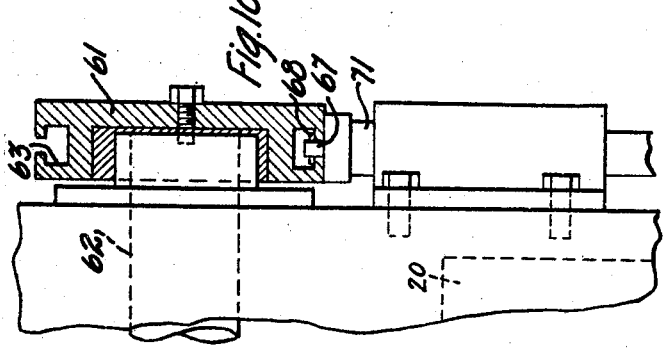
Inventor
Walter Bonsor
by [signature] Atty.

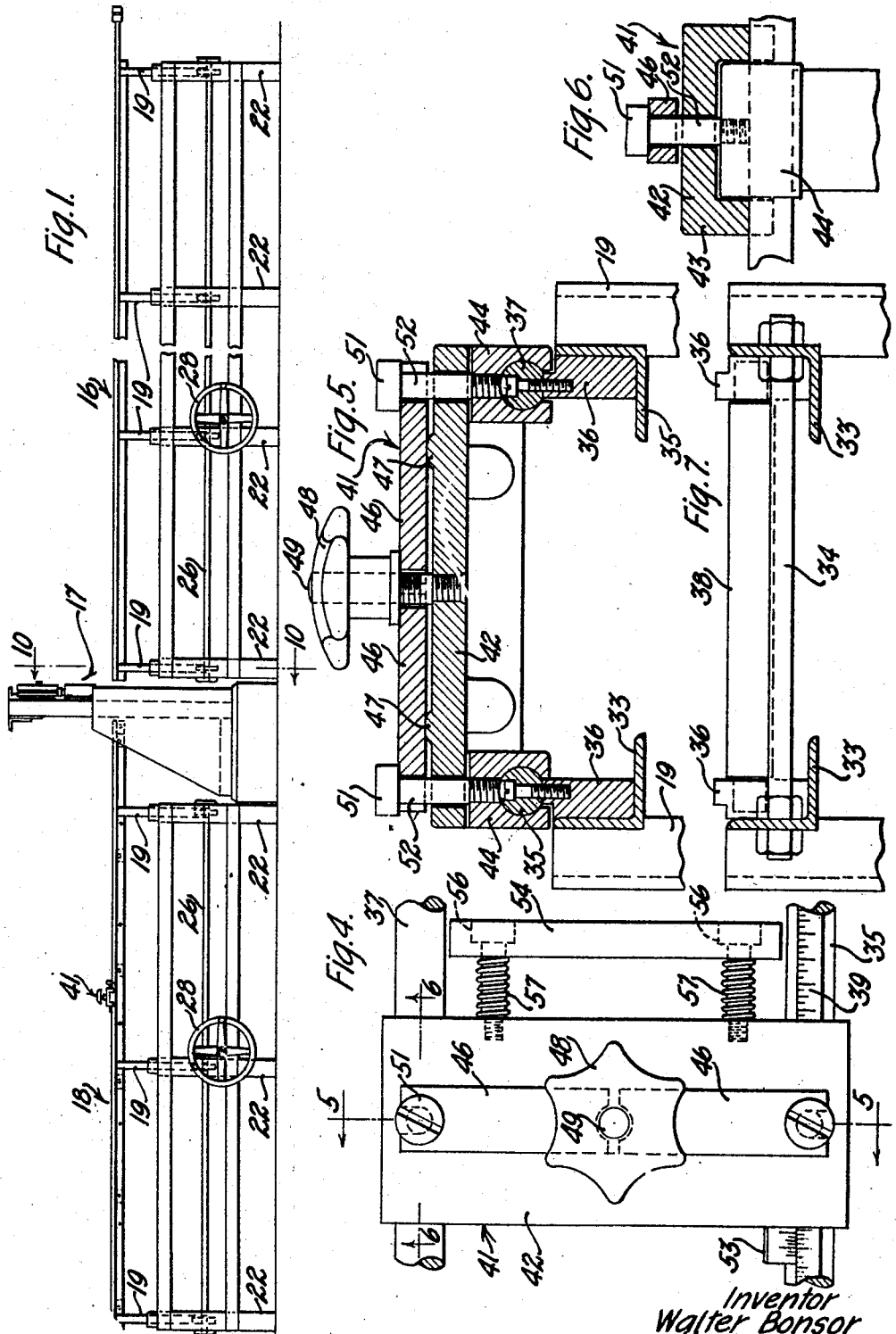

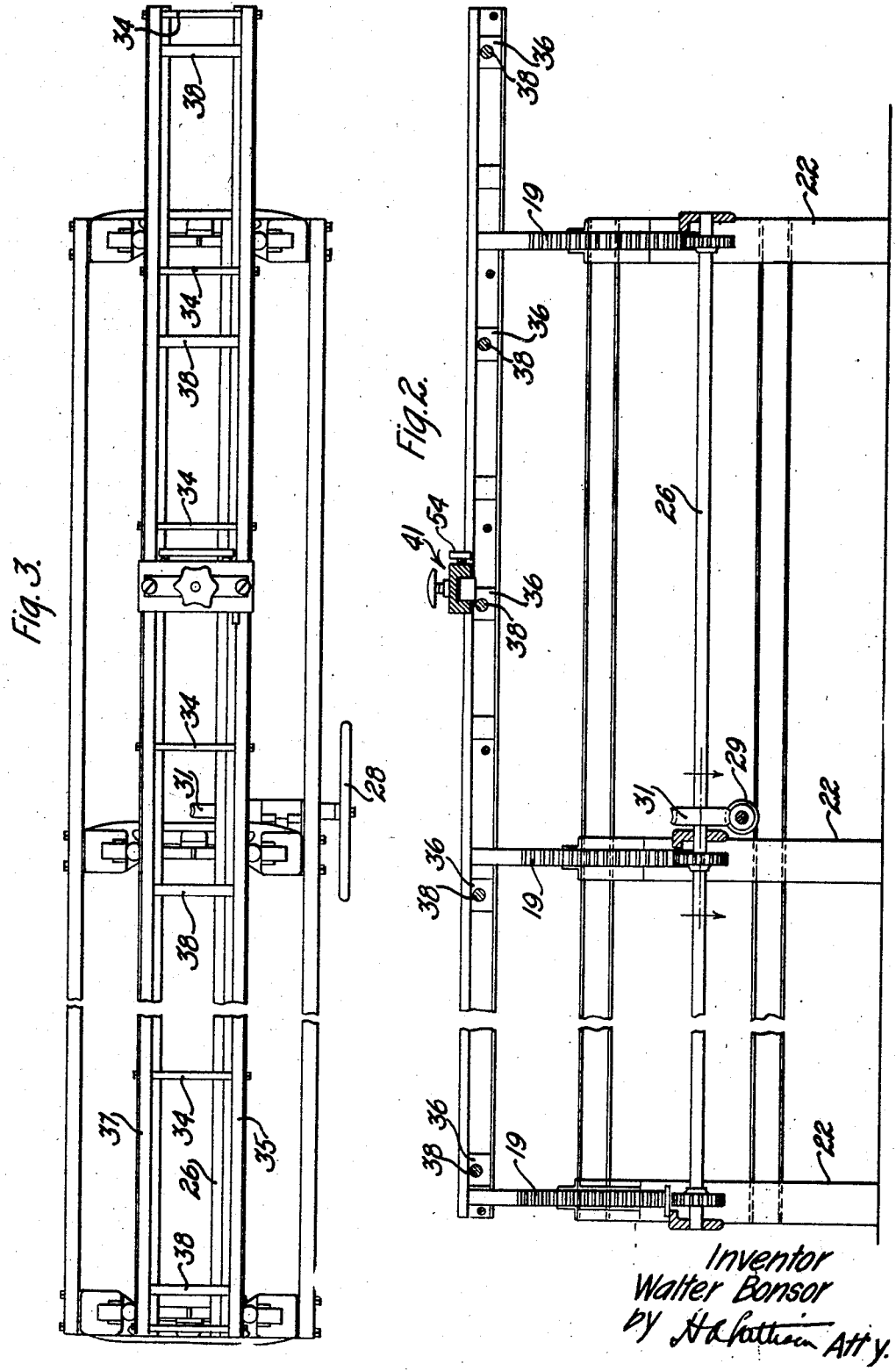

Patented July 21, 1931

1,815,699

UNITED STATES PATENT OFFICE

WALTER BONSOR, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR POSITIONING AND HOLDING WORK FOR MATERIAL WORKING APPARATUS

Application filed October 15, 1926. Serial No. 141,796.

This invention relates to apparatus for positioning and holding the work for material working apparatus, and more particularly for positioning and holding work for a metal shear in which a number of shearing elements for different shapes and sizes of stock are arranged in a vertical plane.

An object of the invention is to provide a mechanism for positioning and holding the work with respect to a material working element in such a manner as to permit the performance of work thereon accurately and expeditiously.

In accordance with one embodiment thereof, the invention provides an apparatus for aligning the work having a stop for indicating the length of the material to be cut and a device for clamping the material just prior to the shearing operation.

It is believed that a better understanding of the invention may be had by reference to the following description taken in conjunction with the accompanying drawings, in which Fig. 1 is a side elevation of the apparatus operatively associated with a metal shear;

Fig. 2 is an enlarged side elevation of the output table shown on the output side of the shears in Fig. 1;

Fig. 3 is a plan view of the output table shown in Fig. 2;

Fig. 4 is a plan view of the stop gauge for determining the length of material to be cut;

Fig. 5 is a sectional view taken on the line 5—5 of Fig. 4;

Fig. 6 is a sectional view of the stop gauge taken on line 6—6 of Fig. 4;

Fig. 7 is a detail view showing the manner in which the rollers are mounted on the tables;

Fig. 8 is a view taken on the line 10—10 of Fig. 1 showing the work holding mechanism in side elevation and a sectional view of the table raising mechanism;

Fig. 9 is a sectional view on the line 9—9 of Fig. 8;

Fig. 10 is a side view of the work holding mechanism showing the holder actuating cam in section, and Fig. 11 is a front view of the apparatus illustrated in Fig. 10 with parts broken away to show the construction of the holding mechanism.

Referring to the drawings in which the same numerals designate similar parts in the several views, the apparatus consists essentially of three units, an input table 16, a shear 17 including a material holding device, and an output table 18.

The height of the tables is made adjustable for the purpose of accommodating them for variously shaped pieces of material which are to be cut, the different shearing elements for which are arranged in a vertical plane as shown in Fig. 8 wherein the table is shown in its uppermost position, supporting a channel iron which is to be sheared, and wherein a square rod, a round rod, and an angle iron are shown in their respective apertures in the holding device and shear 17 to show the position to which the table would have to be moved to support them for shearing. The shearing elements consist of a vertical guide member 15 which cooperates with a vertically reciprocable knife 20. Both the shearing elements have apertures therethrough which conform substantially to the shape of the material to be sheared and the edges of these apertures serve as the shearing surfaces. The tables are carried by a plurality of vertical racks 19 which are slidably mounted in grooves 21 (Fig. 9) formed in the sides of legs 22 of the tables and are engaged by a plurality of gear wheels 23 and 24, the rotation of which serves to elevate or lower the tables. The gear wheels 23 are mounted on a horizontal shaft 26 while the gear wheels 24 are mounted on short shafts 27 and are rotated by engagement with gear wheels 23, which may be rotated by means of a hand wheel 28 whose movement is communicated to the wheels 23 through a worm 29 and gear 31. The legs 22 of the tables comprise a plurality of hollow castings adapted to house counterweights 32 to balance the weight of the tables.

The upper ends of the vertical racks of each table carry a pair of angularly shaped members 33—33 which extend the full length of the table and are held in a definite spaced relation by means of bolts 34 (Fig. 7). At spaced intervals along the angular members are provided a number of supports 36 upon which are mounted a pair of parallel rods 35 and 37. Each pair of oppositely disposed supports 36 further serves as bearing members for rollers 38 upon which the material to be cut may be rolled toward or away from the shear.

The output table 18 is provided with a stop gauge 41 (shown in detail in Figs. 4, 5 and 6) which is slidably mounted on the rods 35 and 37, but which may be firmly clamped to the rods at any desired position. The stop comprises a plate member 42 having two downwardly projecting flanges 43—43 which rest upon the rods 35 and 37. Intermediate the flanges on each rod is a member 44 which partially surrounds the rod and which together with the flanges 43—43 resting upon the rods acts as a clamp when a downward force is exerted on the flanges and an upward force is exerted upon the member 44. The clamping forces are occasioned by a pair of bars 46—46 which rest upon a pair of beads 47—47 acting as a pivot. One end of the bars 46—46 engages a knob 48 which is mounted on a threaded stud 49 in the plate 42. When the knob is rotated so as to move downwardly on the threaded stud the bars 46—46 tend to pivot over the beads 47—47 and engage heads 51 of bolts 52 which pass loosely through the bars and the plate 42 and are attached to the clamping member 44, drawing this member upwardly and forcing the plate downwardly to firmly clamp the stop in position. The rod 35 is provided with a flat top portion 39 upon which a scale is marked and cooperating therewith is a projection 53 on the top also provided with a scale which forms in effect a vernier scale so that the stop may be accurately set to measure the length of the material to be cut. The side of the stop toward the shear is provided with a bar 54 which is slidably mounted on a pair of bolts 56—56 and is normally held in its outermost position by springs 57—57. The springs 57—57 are of such rigidity that the ordinary impact of the material while being placed in position will not flex them, however when the material is being sheared there is a slight but forceful movement of the material toward the stop which would displace the stop from its position but for the yieldability of the bar 54 and alter the length of the next piece of material to be cut.

In order to hold the material firmly in place while being sheared an automatic holding device is provided (Figs. 8, 10 and 11), an actuating cam 61 of which is mounted on the main shaft 62 of the shear. The cam 61 is eccentrically mounted and is provided with a circumferential groove 63 of T-shaped cross-section. A holding element 64 is provided with an arm 66, a flat portion 67 of which extends into the groove 63 and is retained therein by a cross-pin 68. When the cam is rotated the holding element is positively withdrawn from the holding position by the raising of the cross-pin as the circumferential groove is rotated. The downward movement of the holding element is communicated to the arm 66 by a spring which is forced downwardly by a sleeve 71 engaging the peripheral surface of the eccentric cam 61. The holding element is maintained in a given path by a guide 72 which also serves as a housing for the spring and sleeve connection between the cam and the element. The cam is mounted on the main shaft in such a position that the element will engage the material just prior to the cutting operation. The square rod, the round rod, and the angle iron shown in Fig. 8 would not be sheared simultaneously with the channel iron but would require the support of the table and are shown simply to illustrate how the single holding element 64 is adapted to hold any one of four differently shaped pieces of material in the vertical guide member 15 of the holding device.

In order to operate the apparatus the tables are adjusted to the proper height by means of the hand wheels 28—28, the height depending on the shape of the material to be cut and the stop gauge is positioned according to the length it is desired to cut the material and firmly clamped there by lightly turning down the knob 48. The material is then laid on the rollers of the input table from which it may be readily fed into the shearing elements which are in direct alignment therewith. The material is inserted until it abuts the stop gauge 41 and just prior to the shearing operation it will be firmly held there by the holding mechanism. As the shear passes through the material, the material is moved slightly toward the stop gauge, however on account of the yieldable nature of the bar 54 the gauge will not be displaced and the next piece of material will be measured and cut with the gauge in the same position.

It will be understood that the embodiment of the invention herein described and illustrated is merely a convenient and useful form of the invention, which is capable of many other modifications without departing from the spirit and scope of the invention.

What is claimed is:

1. The combination with a material working element, of an adjustable table, a plurality of oppositely disposed racks supporting the table, a pair of gear wheels engaging the oppositely disposed racks and meshing with each other, and means for rotating one of said gear wheels causing a rotation of the other wheel whereby the table is adjusted.

2. The combination with a material working element, of a table for supporting the material to be worked, a rod supported by said table, a stop gauge slidably mounted on said rod, comprising a member resting on the rod, and a member partially surrounding the rod, and means for exerting a clamping force between said members to hold the stop gauge in place.

3. The combination with a material working apparatus, of a device for holding the material to be worked comprising an element having arms for engaging various shapes of material, means for resiliently engaging the element with the material, and means for positively withdrawing the element from the material.

4. The combination with a material working element, of a table for supporting the material to be worked, a rod supported by the table, a stop gauge mounted on said rod comprising a plate having a bead and supported by the rod, a member substantially surrounding the rod, a headed bolt carried by said member and protruding through an aperture in the plate, a lever pivoted on the bead of the plate and engaging the head of the bolt, a threaded stud fastened to the plate, and a knob for the threaded stud whereby the lever may be caused to press against the head of the bolt to effect the clamping of the gauge to the rod.

5. The combination with a shear, of a vertical guide member having a plurality of apertures therein for receiving and holding material of various shapes during the shearing operation, and a vertically reciprocable member cooperating with said guide member to clamp the material securely in a selected aperture thereof during the shearing operation.

In witness whereof, I hereunto subscribe my name this 29th day of September A. D., 1926.

WALTER BONSOR.